(12) United States Patent
Donahue et al.

(10) Patent No.: US 6,523,417 B1
(45) Date of Patent: Feb. 25, 2003

(54) END OF LINE SEAT FUNCTION AND MOTION TESTER

(75) Inventors: Thomas J. Donahue, Livonia, MI (US); Duane S. Pohlman, Howell, MI (US); Lisa M. Bonza, White Lake, MI (US); Ian R. Dunn, Brighton, MI (US)

(73) Assignee: Electrical Power & Design, Inc., Redford, MI (US)

( * ) Notice: Subject to any disclaimer, the term of this patent is extended or adjusted under 35 U.S.C. 154(b) by 0 days.

(21) Appl. No.: 09/375,726

(22) Filed: Aug. 17, 1999

(51) Int. Cl.[7] ............................. G01L 1/24; G06M 7/00
(52) U.S. Cl. .......................................... 73/800; 250/221
(58) Field of Search ............................. 73/800; 250/221

(56) References Cited

U.S. PATENT DOCUMENTS

| | | | |
|---|---|---|---|
| 3,793,739 A | 2/1974 | Hoffman et al. | |
| 3,923,402 A | 12/1975 | Turcotte | |
| 4,638,982 A * | 1/1987 | Misher et al. | ............... 267/131 |
| 5,456,019 A | 10/1995 | Dowell et al. | |
| 5,585,625 A * | 12/1996 | Spies | ........................ 250/221 |
| 5,588,216 A | 12/1996 | Rank et al. | |
| 5,729,475 A * | 3/1998 | Romanik, Jr. | ............... 364/559 |
| 5,737,845 A * | 4/1998 | Marasus | ..................... 33/545 |

* cited by examiner

Primary Examiner—William Oen
Assistant Examiner—Maurice Stevens
(74) Attorney, Agent, or Firm—Young & Basile, P.C.

(57) ABSTRACT

An end of line seat tester for adjustable seats, comprising an array of optical sensors for sensing and measuring the physical adjustment of seat components such as a headrest, seatback or seat cushion. In a preferred form the optical sensor array is combined in closed-loop fashion with an internal function tester connected through a powered seat control module by tether to monitor the internal function of the power adjustment mechanisms. The external, optical sensing of the seat adjustments can be used to verify the internal testing of the seat adjustment mechanisms, both as to static adjusted positions and real time adjustment motion.

2 Claims, 8 Drawing Sheets

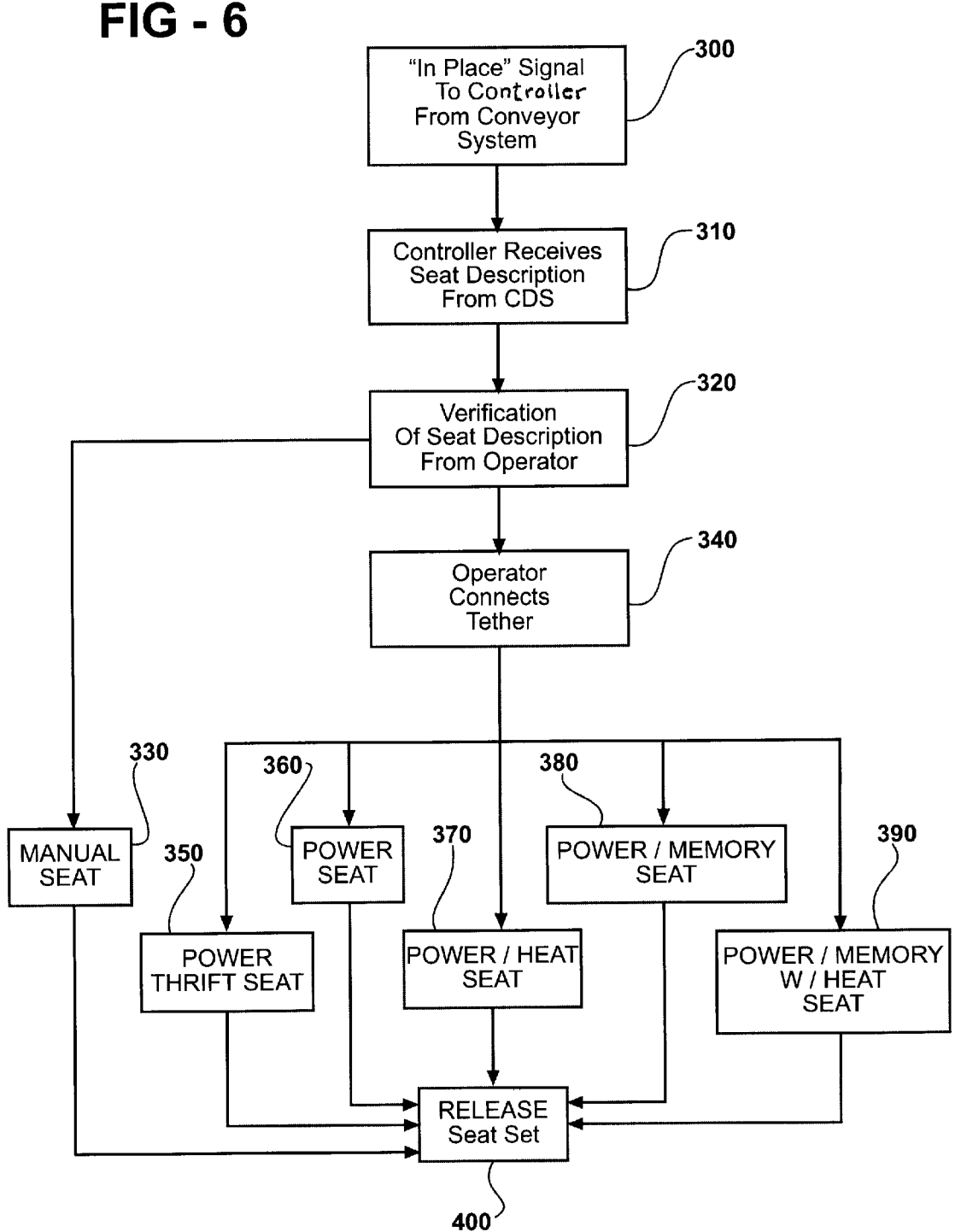

END OF LINE SEAT FUNCTION AND MOTION TESTER

FIELD OF THE INVENTION

This invention is in the field of equipment for end-of-assembly line testing of seats, in particular vehicle seats with manual and/or power adjustments.

BACKGROUND OF THE INVENTION

All automotive seats manufactured today include adjustment features, whereby the operator can adjust one or more of the seat cushion, seatback and head rest.with manual controls or electrical switches controlling mechanical or power adjustment mechanisms built into the seat. The more "premium" the vehicle in which they are installed, the more adjustment features the seats tend to have. Seats that are purely manually-adjusted, purely power-adjusted, or a hybrid of manual and power adjustments are known.

Referring to FIG. 1, adjustable seats 12 are typically completed on an assembly line, moving down and off the line on a specialized shipping pallet 14. It is common to palletize two seats on a single pallet as shown, for simultaneous testing. At or near the end of the line, the adjustable parts of the palletized seats are typically inspected and tested by a human operator using a combination of physical manipulation of the seat's manual adjustment controls, such as levers, and/or power adjustment switches such as 13b, 13c. In the example of FIG. 1, seatback 12b and seat cushion 12c are power adjustable.

In a typical end of the line seat testing station, a palletized seat arrives at the station and is locked into a fixed testing position by a "pallet pusher" or similar, known positioning device. If the seat has power adjustments, the operator plugs a power supply tether into a wiring harness connector built into the seat. This wiring harness connector is wired into the various adjustment motors, switches, and control modules in the seat; when the seat is installed in a vehicle, the wiring harness connector is plugged into a mating harness on the vehicle which supplies power, control signals and data communication from various systems on the vehicle. The electronic tether plugged into the wiring harness connector at the end-of-line testing station supplies power, control signals and data communication so that an operator can run the powered seat through its various adjustments.

As the operator runs a seat (manual or powered) through its adjustments at the testing station, end of line testing apparatus verifies basic seat adjustment functions performed by the operator by providing a signal corresponding to various adjustment positions or end-of-travel limits. There are generally two types of seat testing system: "internal" and "external".

The "internal" type tests powered seat component function through the tether connection to the wiring harness connector, communicating through the tether with a computer software or PLC-type controller to monitor and verify internally-generated seat adjustment parameters such as motor speed, motor stall current, direction of motor travel, switch function, etc. In more sophisticated seats with built-in "seat modules", other internal seat parameters can be tested through the wiring harness connector and seat module via the tether, for example the function of seat heating equipment. A problem with this "internal", tether-type testing apparatus is that an internal failure of an adjustment mechanism, for example a premature motor stall or a broken or improperly coordinated connection between a motor and the part being adjusted, can result in a "pass" indication to the operator on a display screen while the actual seat adjustment is inadequate.

The "external" type of seat testing apparatus can be used for either manual or powered seats, and comprises an external array of limit.switches connected to wands, probes or contact arms to generate a signal of physical seat position when contacted or moved by an associated part of the seat. For example, when the operator moves or runs the seatback to its full-recline position, the seatback will contact and move a limit switch actuator to generate a full-recline verification signal to the operator. This signal is typically in the form of a light display visible to the operator.

Referring to FIG. 2, one example of a prior art end-of-line tester is generally illustrated at 20, comprising contact arms 22a–22d mounted on a frame 26. Frame 26 in turn is supported on a sliding base 28 whose position can be moved toward and away from seat 12 on a track or rail 30 by a powered pusher mechanism 32 of known type. Base 28 may slide on rail 30 via carriage portions 28a.

Contact arms 22a–22d end in limit switches 24a–24d, positioned for contact with associated portions of seat 12 in their respective fully-adjusted positions. For example, uppermost limit switch 24a is located to be engaged by headrest 12a when the seat is either fully reclined or fully aft (depending on the seat's adjustability and the preferred test parameter); limit switch 24b should be contacted by the upper seatback 12b; limit switch 24c should be contacted by the lower seatback 12b, and, lowermost limit switch 24d should be contacted by seat cushion 12c in the fully aft position.

Once tester 20 is pre-positioned with limit switches 24a–24d as described above, the operator (not shown) typically will lean over seat 12 and operate its adjustment controls (such as 13b, 13c shown in FIG. 1) to recline seatback 12b, and to move seat cushion 12c fore and aft. When seatback 12b reaches its full-recline position (shown in broken lines) it should contact certain limit switches to trigger a "pass" signal to the operator in known fashion. Having been successfully tested, seatback 12b is then brought forward to its full-up position, and the operator translates seat cushion 12c rearwardly until it reaches a full-aft position (broken lines) in which limit switch 24d generates a "pass" signal.

It is also known to use test equipment such as that shown at 20 to check for the "presence" of major seat parts such as seatback 12b and seat cushion 12c, for example by pushing tester 20 into contact with seat 12 in its at-rest position (solid lines) and generating "presence" signals upon contact of limit switches 24a–24d with their associated seat portions.

One problem with "external" prior art testers of the type shown in FIG. 2 is that they can be "fooled" by operators who simply press the limit switches to generate a "pass" signal whether or not the seat parts have been successfully adjusted. Another problem with such testing apparatus is that it is limited to testing static seat positions, for example the "presence" of major parts and the "full-aft" or "fully-reclined" limits of travel. Additionally, the overall number of seat adjustment functions capable of being tested by such apparatus is limited by the need to position contact arms and limit switches at every point where a desired presence or travel limit should be sensed. A further problem is the need to frequently re-position such testers and their contact arms. A tester configured for contact with a particular seat model cannot be used for other models without adjusting the number and placement of the contact arms; a tester configured for "presence" testing must be reconfigured for "adjustment" testing.

SUMMARY OF THE INVENTION

The present invention is an end of line tester apparatus, system, and method which is capable of testing a virtually unlimited number of seat adjustment functions; which cannot be fooled by an operator; and which cannot mistakenly verify (or fail to verify) a seat part adjustment due to internal error of a seat adjustment mechanism. The inventive tester is further capable of measuring not only the presence and end-of-travel limits of the adjustable seat parts, but further can measure a full range of both seat motion and internal adjustment function in real time.

In its broadest form the invention comprises an array of optical ranging type position sensors located behind the seat assembly at the test station, with one or more sensors associated with one or more target portions of the seat to measure a particular adjustment. In a preferred form, the optical sensors are infrared or laser distance-measuring devices of known type, although other known types of sensors can be used, for example radar sensors and other non-contact ranging/sensing devices. In a further preferred form one or more of the sensors may be dedicated to determining the presence or absence of optional seat parts, such as armrests. Sensors primarily used for measuring the adjustment of certain seat parts can also be used to establish their presence at the beginning of the test cycle.

In a further form of the invention useful for powered seats, the optical sensor array operates in a closed loop with internal seat function testing equipment. In the preferred form the output of the optical sensor array communicates with an internal function tester, for example a computer or programmable logic controller (PLC) communicating by tether with internal seat adjustment mechanisms through the seat's wiring harness connector. In closed loop fashion the optical sensor output and real time motor function are compared as the respective seat part is adjusted, and operator inputs to the internal function tester such as seat model or type can be verified by checking for the presence of standard or optional components which should be found on the operator-entered model/type.

Another advantage of the present invention is the ability of the optical sensor array to be zeroed out for each seat assembly to accommodate positioning differences due to different types of seats, variations in the pallet/conveyor system, etc. In a closed loop system with internal function testing, the optical sensor array may be zeroed corresponding to internal zero measurements at the beginning of the test cycle.

For powered seats, the closed loop system also gives the operator the ability to isolate specific motor function/performance, allowing accurate diagnosis of internal errors via external sensing/verification. By externally verifying the internal testing of seat adjustment and position taken through a powered seat's wire harness connector by tether, the optical sensor array provides a comprehensive, virtually mistake-proof system and method for making sure that power-adjustable seats are fully functional when they come off the assembly line. These and other features and advantages of the present invention will become apparent upon further reading of the specification in light of the accompanying drawings.

BRIEF DESCRIPTION OF THE DRAWINGS

FIG. 6 is a schematic flowchart representation of the general method for testing seats using the non-contact sensor array and closed loop system described above;

DETAILED DESCRIPTION OF THE ILLUSTRATED EMBODIMENT

Figure 1:
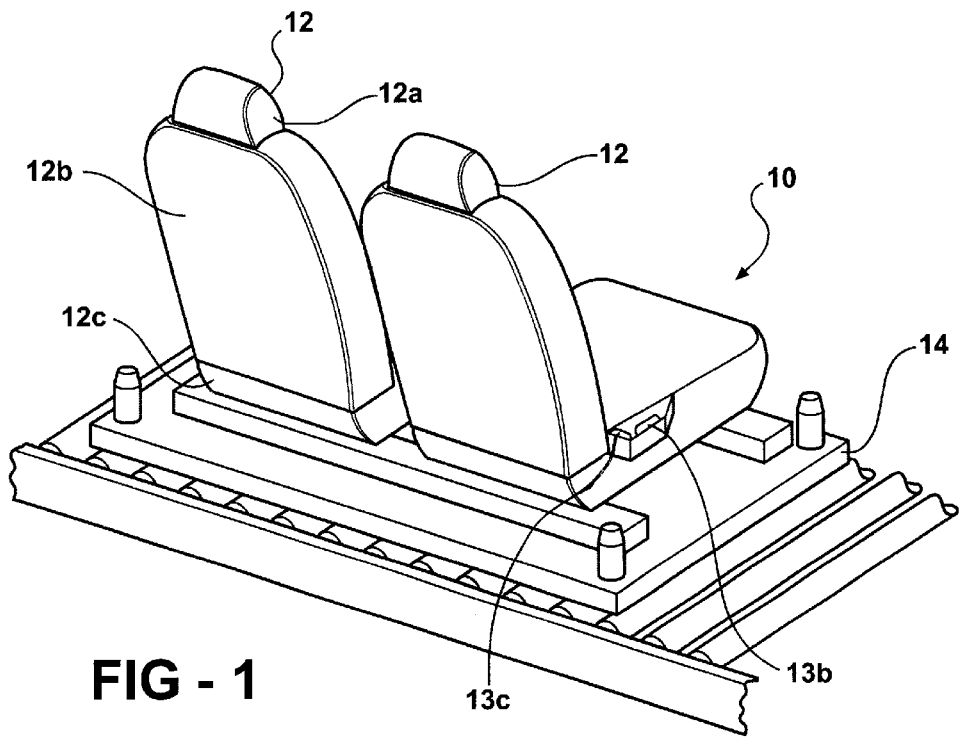
FIG. 1 is a rear perspective view of a palletized seat assembly of known type, in which two seats are firmly mounted on a pallet for both shipping and testing.
Figure 2:
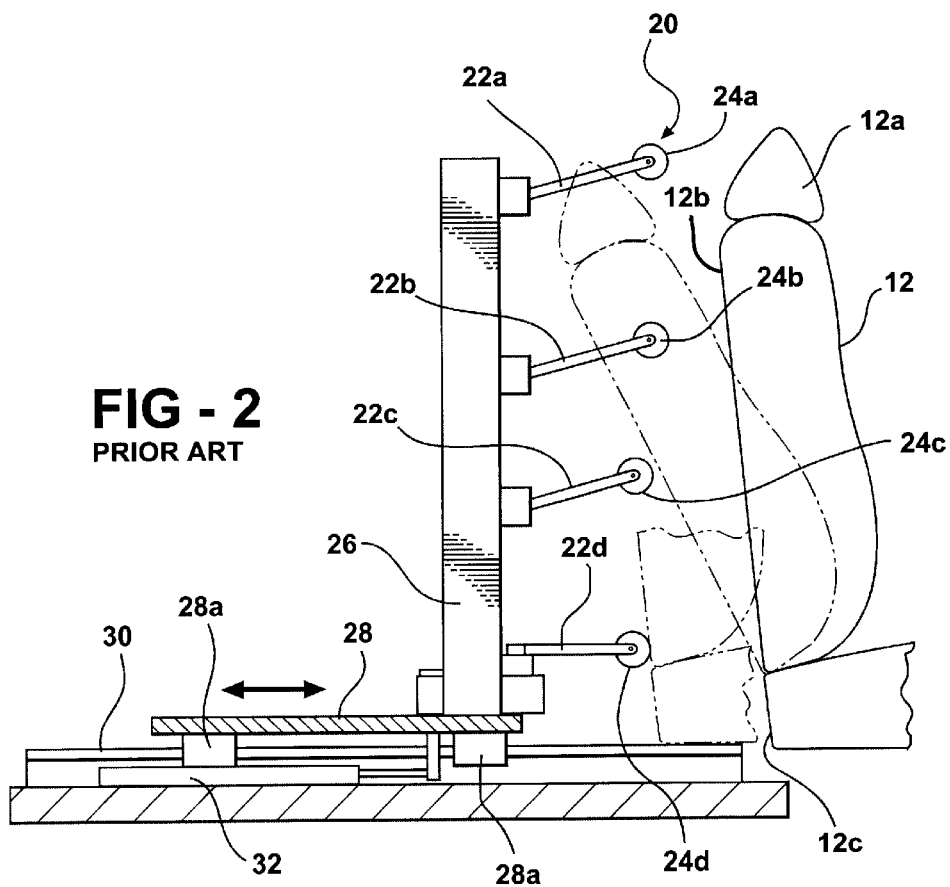
FIG. 2 is a side view of a prior art end of line seat testing apparatus using seat-contacting limit switches.
Figure 3:
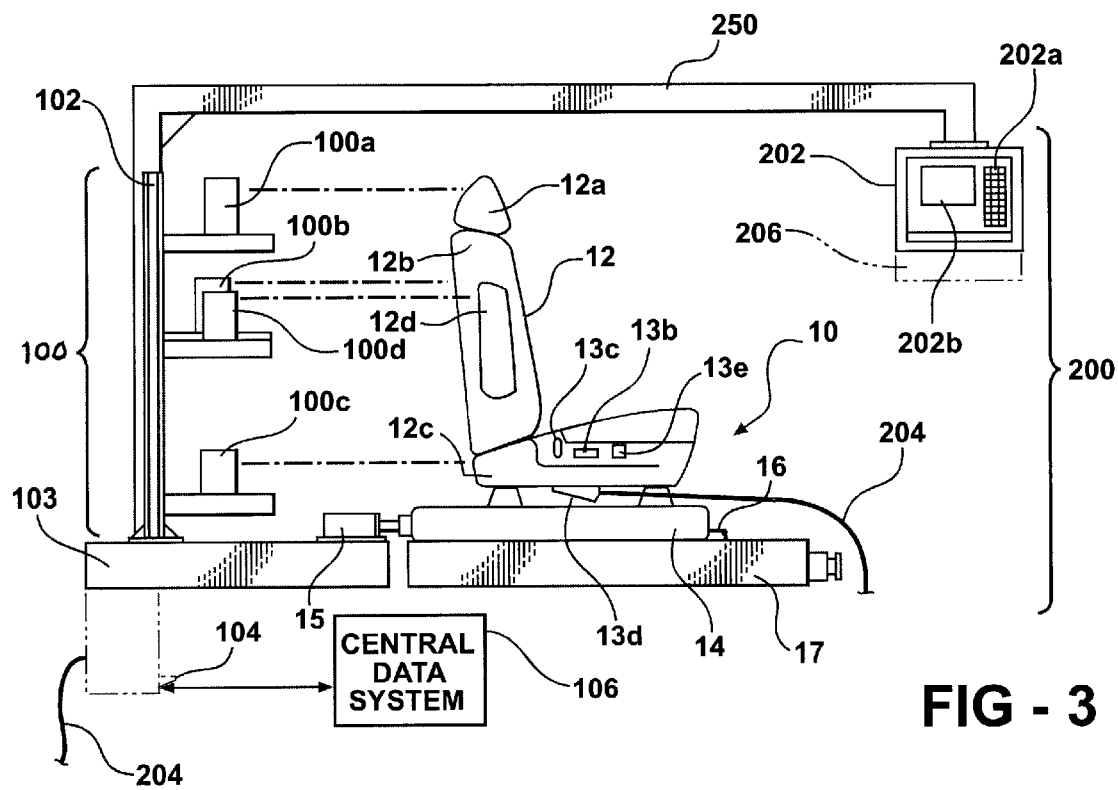
FIG. 3 is a side view of a closed loop end of line seat testing system according to the present invention, using a non-contact optical sensor array for detecting seat motion and position.
Figure 4:
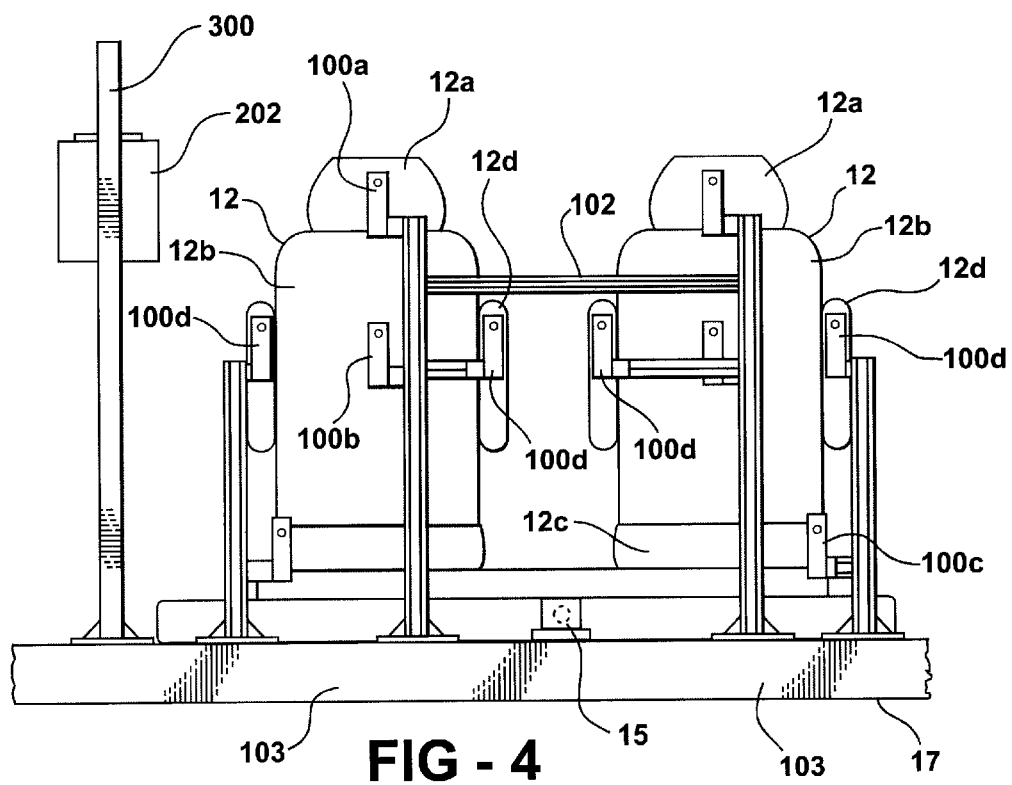
FIG. 4 is a rear view of the inventive non-contact sensor array shown in FIG. 3, arranged for a palletized dual-seat assembly so that two adjustable seats can be tested simultaneously.
Figure 5B:
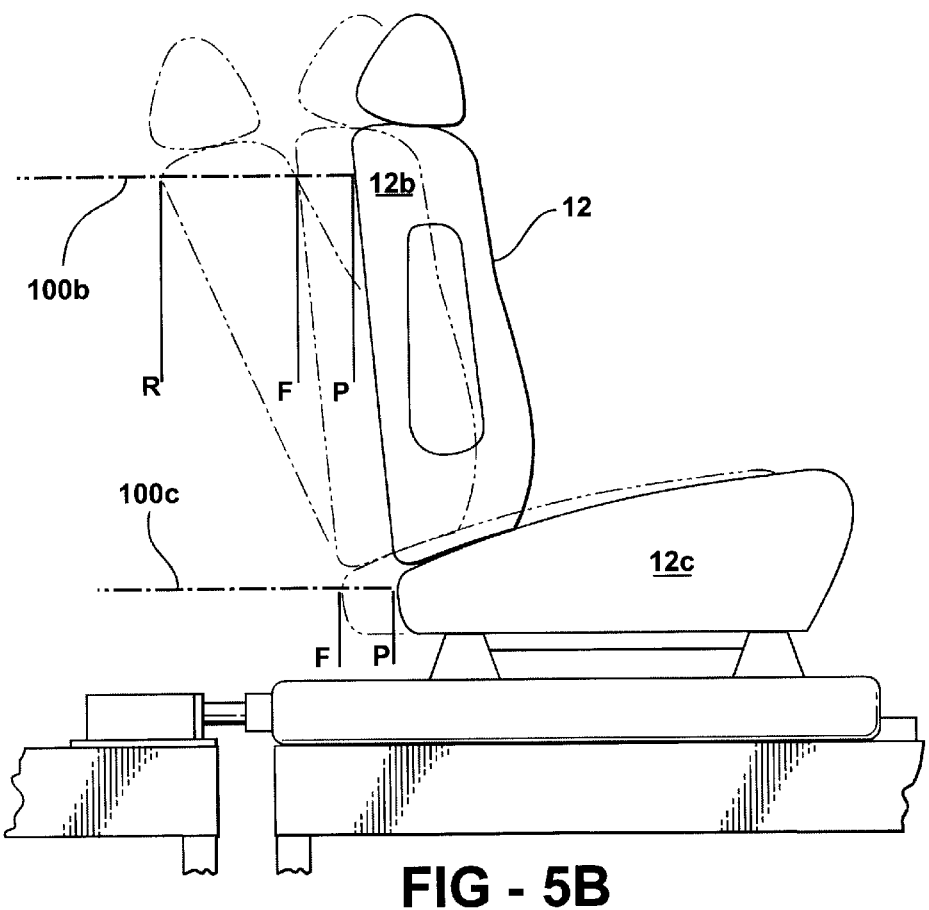
FIG. 5B illustrates the non-contact sensing of seatback reclining adjustment and horizontal seat cushion fore/aft adjustment; and, FIG. 5C illustrates the non-contact sensing of the rotational angle of the seat cushion and seatback.
Figure 5:
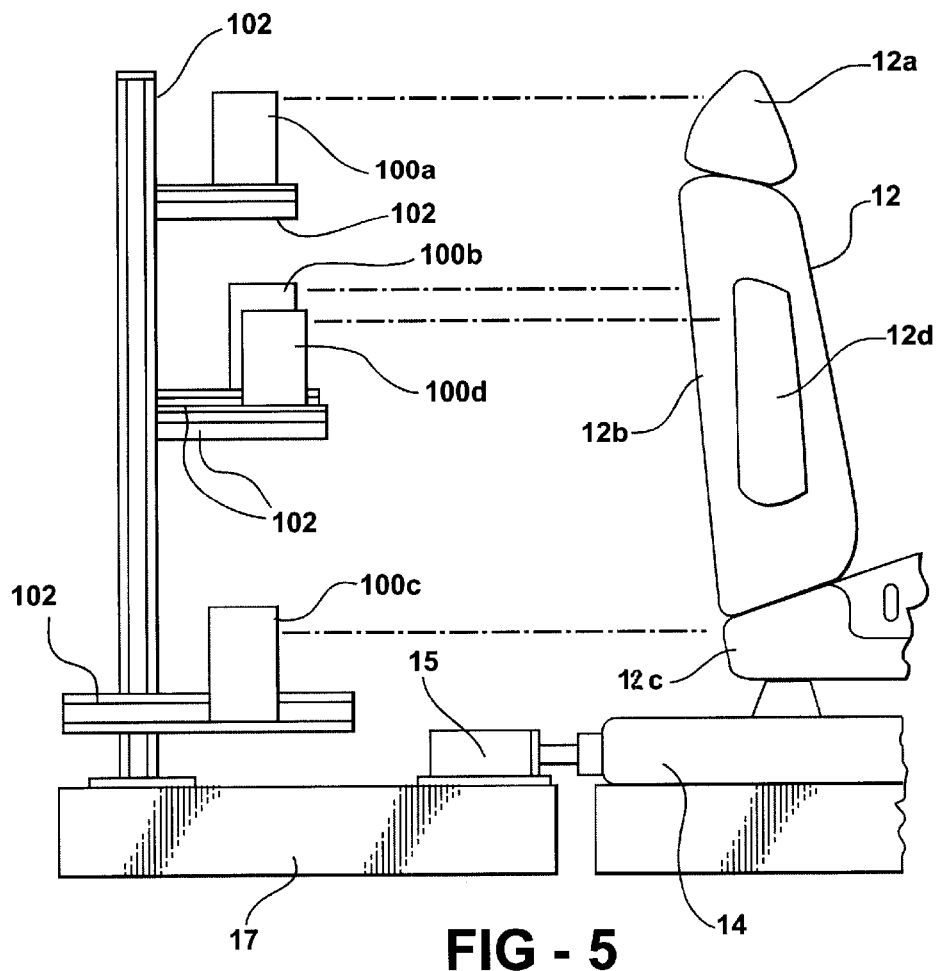
FIG. 5 is an enlarged side view of the non-contact sensor test apparatus shown in FIG. 3.

An illustrative and preferred example of an end of line testing system according to the present invention is illustrated in FIGS. 3–5. In this illustrated embodiment the system is built around a standard pallet conveying platform 17 of known type for conveying the palletized seat assembly 10 illustrated in FIG. 1 to the test station. It will be understood by those skilled in the art that the apparatus for conveying palletized seat assembly 10 to the test station can be any known type, and the seat assembly could even be placed manually at a test station incorporating the invention.

Additionally, it will be understood that the type of seat assembly being tested will vary depending on the make and model of the vehicle for which it is intended. While the illustrated example refers to a "palletized" seat assembly, other structures and methods for positioning seat assemblies at a test station using the present invention can be used. And it will be understood that although a dual-seat assembly as illustrated is common, the invention is equally useful for single-seat assemblies.

In FIG. 3 the palletized seat assembly 10 has arrived at the end-of-the line test station, where the seat assembly is positioned in a proper (and preferably repeatable) test position using known methods and apparatus. For example, manually-actuated or electrically-actuated mechanical or hydraulic positioning devices such as those shown schematically at 15, 16 can be used to position and lock pallet 14 in the desired test position. In the illustrated embodiment a hydraulic "pallet pusher" 15 of known type is used to push the pallet forwardly into positive locking engagement with one or more mechanical stops or clamps 16. Such structure is known in the art and may take many different forms, and is not critical to the invention.

Once the palletized seat assembly is positioned and firmly secured in its test position as shown in FIG. 3, the operator connects a communication tether 204 to each seat's built-in wire harness connector 13d, usually accessed underneath the seat as illustrated in FIG. 3. Tether 204 supplies 12-volt DC power through the wire harness connector to control switches and internal adjustment mechanisms (and optionally to an internal "seat module" in certain seat models) just as if the seat were installed in a car and supplied with power from the car battery system. Tether 204 combines this power supply function with data communication capabilities for sending and receiving information and control signals to and from the internal adjustment mechanisms and/or seat module in known fashion. Internal seat modules (not shown), the seat-side wire harness connector 13d, and tether 204 in the illustrated embodiment are known, commercially-available components and such structure and their equivalents are known and used in power-adjustable seat assemblies manufactured today.

It will be understood by those skilled in the art that power supply to the seat need not be combined with tether 204. Power could be supplied by a separate tether or other known type of connection, but the integration of both power supply and communication in a single tether is preferred.

With palletized seat assembly 10 now both secured in its test position and electronically tethered at the test station, the seat assembly is ready to be tested by the system of the present invention. An optical sensor array 100 is located behind each seat 12, in the illustrated embodiment mounted on a fixed frame 102 secured to a free-standing base 103 positioned securely next to conveyor platform 17. In the illustrated embodiment of FIGS. 3 and 4, sensor array 100 comprises multiple sensors 100a–100d, each associated with or targeted to a corresponding portion of a seat 12 to measure and sense adjustment, position and presence without physical contact. In the illustrated embodiment seat 12 is a powered seat comprising a manually adjustable headrest 12a, an electrically adjustable seatback 12b, an electrically adjustable seat cushion 12c, and a manually adjustable, optional armrest 12d. Illustrated seat 12 also includes switch controls 13b, 13c and 13e for respectively controlling seatback 12b, seat cushion 12c, and an adjustable lumbar support (not shown) within the seatback. As best shown in FIG. 4, sensor 100a is targeted to headrest 12a, sensor 100b is targeted to seatback 12b, sensor 10c is targeted to seat cushion 12c, and sensor load is targeted to optional armrest 12d. Adjustment of the lumbar support is a primarily "internal" adjustment and therefore is not sensed by illustrated array 100, although it would be possible to measure external "inflation" or extension of the lumbar support with an additional, front-mounted sensor.

In the illustrated embodiment optical sensors 100a–100d comprise commercially available, self-contained, adjustable photoelectric proximity switches capable of measuring at least the static position of their targeted seat portions, and preferably capable of measuring or responding to changes in distance between them in real time. The output of the illustrated sensors is an analog signal corresponding to real-time distance.

Figure 3A:
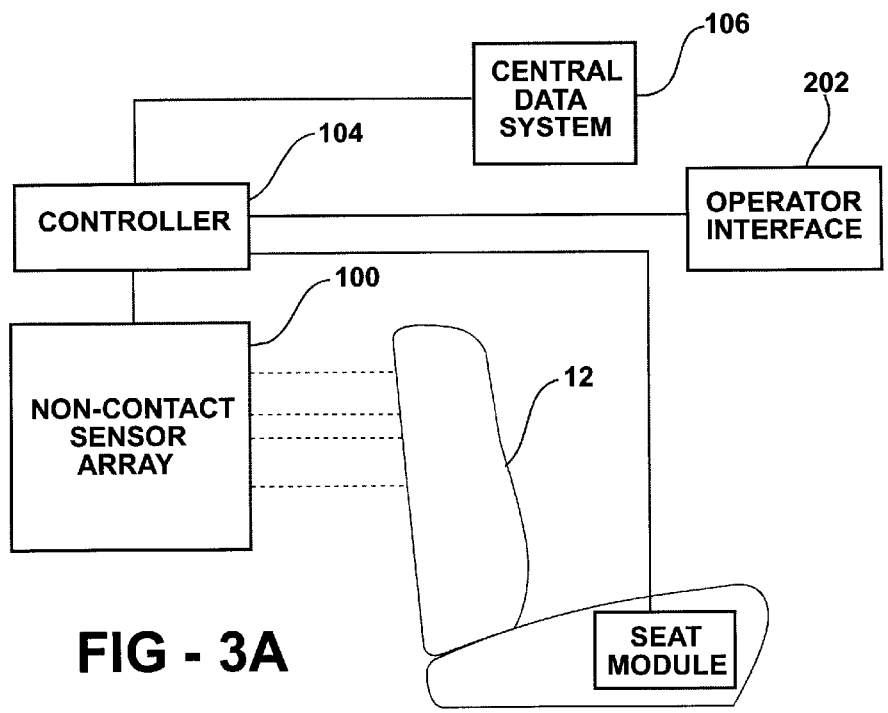

Sensor array 100 can be controlled and powered using known, commercially available equipment often supplied with the sensors themselves plus, in the present invention, computer software and/or a programmable logic controller (PLC) shown schematically at 104. In a preferred embodiment, PLC-type controller 104 on base 103 underneath sensor array 100 has a configurable modular controller of the type available, for example, from the Allen-Bradley company, with analog to digital I/O modules, instruction memory, communication ports for the sensors in the array, instruction sets, and other options and features known to those skilled in the art and explained in commercial literature. As will be understood by those skilled in the art, controller 104 can be configured and connected to receive data describing the seat under test from a central data system, manually and/or automatically send control signals to the array sensors, receive analog input from the sensors, send digital sensor output to an operator interface, and receive queries and control signals from an operator interface. An exemplary electrical schematic of the controller 104 and the other portions of the closed loop system is illustrated in FIG. 3A. Because the commercial equipment available for controlling and communicating with the sensor array 100 is so varied (the Allen-Bradley SLC500 family of processors being just one possibility), and because the manner of individually programming/wiring such controllers for control and communication with the sensor array, operator terminal, and seat harness is susceptible of individual variation depending on the seat-testing application, no further detailed explanation is believed to be needed given the ordinary level of skill in the art.

In the illustrated embodiment the operator interface preferably comprises a commercial operator interface terminal, in the illustrated embodiment a display panel type, for example available from Allen-Bradley. Operator display terminal 202 preferably includes both a keypad 202a and a display screen 202b. Interaction between terminal 202 and the operator is controlled by controller 104, which displays and requests information for the operator to follow and enter in the course of testing the seat assembly. In the illustrated embodiment the terminal 202 does not include any programming or memory functions, but provides a simple interface with the programming and memory functions contained in controller 104.

In the illustrated embodiment operator terminal 202 is mounted on a boom 250 which provides a convenient raceway for power and communication wiring between the controller and terminal. It will be understood that a physical, wired connection between controller 104 and operator terminal 202 is not necessary, given known wireless communication techniques, although a standard wire or cable connection is currently preferred.

The sensor array 100 illustrated in FIGS. 3 and 4 is believed to be an invention in its own right, with unlimited flexibility in targeting and sensing multiple seat parts, leave-no-trace verification of seat motion, and the ability to sense not only static position/presence but real time seat adjustment as well. However, in a most preferred embodiment, the inventive sensor array 100 is combined with internal function testing controlled through the operator interface 200, 202 and controller 104 in a closed loop arrangement in which the external, optical verification of seat adjustment is used to verify in real time the internal function test results obtained through tether 204. In particular, the ability of sensor array 100 to measure actual seat motion between various rest positions allows previously unverifiable internal function parameters such as motor speed, current draw, and direction of motor travel to be isolated and verified as the seat is tested.

Optical sensor array 100 additionally can sense and measure ranges of seat motion not previously measurable with contact-type test equipment.

In the illustrated embodiment of FIG. 3, the loop between internal function testing and external seat sensing is closed through a communication link between controller 104, tether 204, and sensor array 100. It will be understood that the closed loop link between sensor array 100 and internal function testing need not be an actual physical or wired link as shown in FIG. 3, but could be made with telemetry using radio, optical or other known remote data transmission techniques. Controller 104 is also connected with a central data system (CDS) 106, a main-frame computer which tracks the identity and location of the seat assemblies and other components moving along the assembly line within a plant in a manner known to those skilled in the art.

The operation of the preferred system illustrated in FIG. 3 will now be described in two parts. First, the operation of novel sensor array 100 will be described in open-loop fashion as if providing the operator with direct open-loop verification of seat position. Then the operation of sensor array 100 will be further described in connection with the closed-loop system and method in which the external seat position measurements generated by sensor array 100 are used in closed-loop fashion to verify internal seat adjustments.

Referring to FIG. 5, sensor array 100 in the illustrated embodiment initially senses the presence of headrest 12a, seatback 12b, seat cushion 12c, and armrest 12d. Sensing the presence of individual seat parts is particularly important in the case of optional parts such as armrest 12d which might accidentally be omitted on the assembly line. Initial presence testing is also useful to zero the individual adjustment sensors 100a–100c relative to the pallet-secured test position generally corresponding to the at-rest, riser full-down, cushion full-back, recliner full-upright positions of the adjustable seat parts. In FIG. 5 the headrest is in a forward, lowered at-rest position; seatback 12b is in a full-upright position, and seat cushion 12c is in a fullback and full-down position. Very often these positions will be the "ship" positions in which they are placed for installation in a vehicle.

Figure 5A:
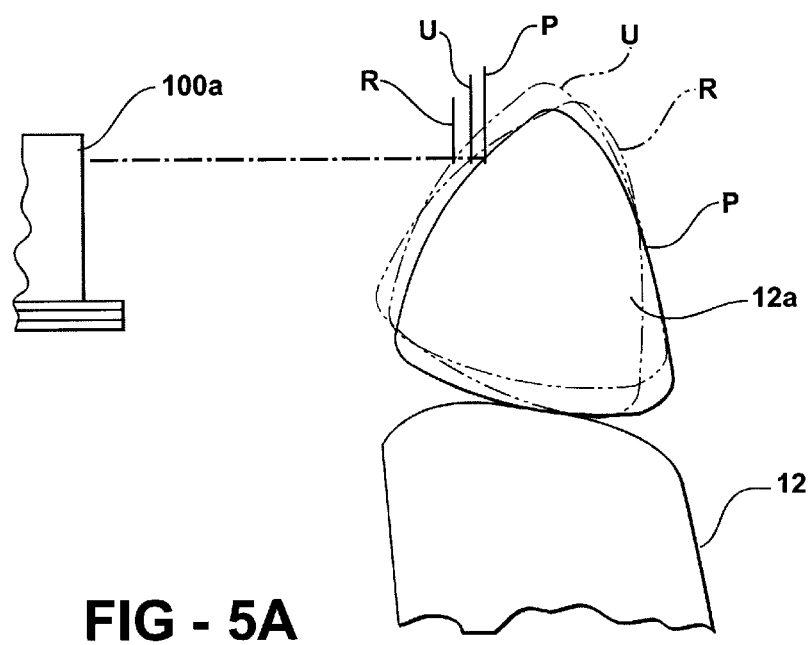
FIG. 5A illustrates the non-contact sensing of headrest adjustments shown in phantom lines.

Referring next to FIG. 5A, sensor 100a senses the initial or at-rest position of headrest 12a, which is then cycled through its full range of motion or motions by an operator physically moving the headrest. Sensor 100a is capable of measuring virtually any position or range of motion of headrest 12a, ranging from a simple "present" position P, to an "up/clear" position U, to a "pivot range" position R. Because sensor 100a can preferably track motion in real time, verification of headrest operation may either be single point verification or may track the motion of the headrest from P to U or P to R or any other combination of headrest motions. Simpler seat models may require only a "present" position to be sensed, while progressively fancier models may require "up/clear", "pivot range" and perhaps other position/adjustment sensing.

Referring next to FIG. 5B, the position and adjustment range of seatback 12b are sensed and tracked by sensor 100b. The simplest sensing operation is to determine the seatback's "present" position P before any adjustments have been made by the operator. The "present" position P will typically be at the seatback full-upright position shown in solid lines, although this may vary depending on the requirements of the seat manufacturer. More sophisticated measurements can be taken by sensor 100b; for example, as the seatback is rotated or reclined from position P to the full "pivot/recline" position R. both the final position R can be detected as well as the real time pivot/recline motion from P to R.

Another position/adjustment measurement which can be made by sensor 100b is "fore/aft" translation F of the seatback 12b as it is carried rearwardly by the motor mechanisms controlling seat cushion 12c. It will thus be understood that certain types of seat adjustment with a single control switch may result in the movement or adjustment of more than one of the seat components, as will be understood by those skilled in the art. In such cases, two or more of the optical sensors may come into play for a single adjustment test.

Still referring to FIG. 5B, the horizontal position and translation of seat cushion 12c are optically sensed by sensor 100c, for example the initial "present" position P and the full-rear "fore/aft" position F, as well as the real time motion of seat cushion 12c between P and F.

Figure 5C:
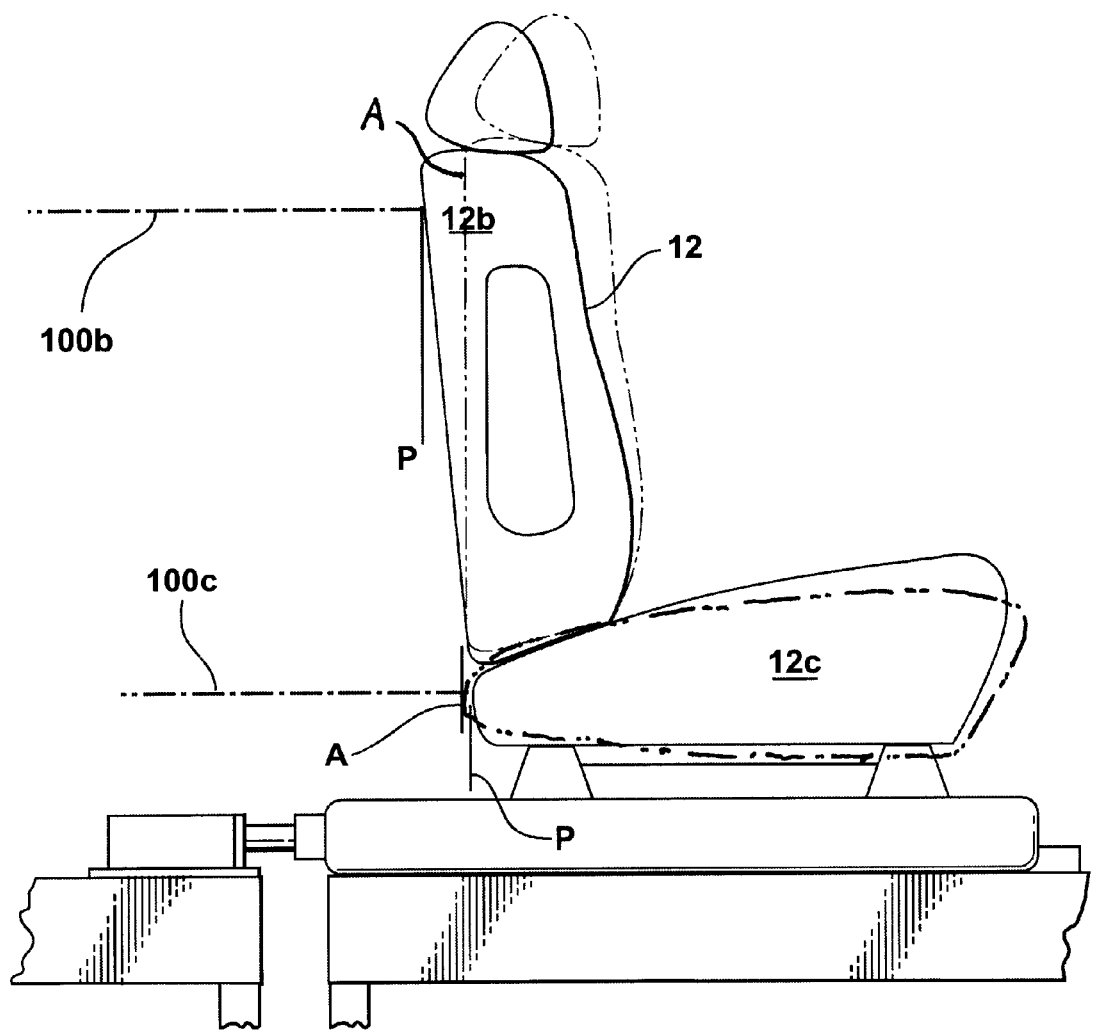

Referring next to FIG. 5C, sophisticated seats will often provide an additional range of motion for seat cushion 12c, namely an upward tilt or rotational motion illustrated in phantom lines at "riser up" position A. In this case sensors 100c,100b are used to measure the non-rotated position P (corresponding to the "present" or "riser down" position P illustrated in FIG. 5B) and the riser-up rotated position A. By comparing the rotational motion of the upper seatback measured by sensor 100b to the stationary pivot point of the riser-up motion, operators are prevented from fooling the tester by a horizontal translation of seat cushion 12c.

Referring now to FIG. 6, the steps for testing seat assemblies using the inventive apparatus as illustrated in FIG. 3 are set forth in flowchart form.

At step 300, the palletized seat assembly enters the end-of-line testing station. Upon receipt of an "in-place" signal from the conveyor system, the controller 104 initiates the test program. Simultaneous with or just prior to initiating the test program, the controller activates the above-described "pallet pusher" to lock the palletized seat assembly in a proper test position.

At step 310, controller 104 receives seat identification data from CDS 106. This data notifies controller 104 of the sequence number, color, and trim style of the seat to be tested, and is presented on display screen 202b, along with a cue to the operator, such as a "ready to test" signal, followed by an "enter/select seat type" query.

At step 320, the operator visually verifies the seat type and/or other information such as seat color, seat trim style, and other seat-identifying parameters which will be apparent to those skilled in the art, and enters this information into controller 104 by punching the appropriate key or keys on the operator terminal 202. The test sequence will continue only if operator properly verifies that the seat present in the test fixture is consistent with the seat identity data received from CDS 106.

If at step 320 the operator verifies that the seat is a manually-adjustable type, the controller proceeds to step 330 where the system prompts the operator, through the display screen 202b, to perform one or more manual seat adjustments. As the operator physically moves the seat recliner and seat cushion through their respective adjustments, sensor array 100 monitors the movement of the seat. The system via the sensor array may also look for the presence of a headrest, armrest, or any other options to be detected. Additionally, the operator can place the seat parts in their proper "ship" positions for transport, verified through display screen signals from controller 104 in response to the sensor array.

If at step 320 the operator verifies that the seat is a power-adjustable type, controller 104 proceeds to step 340 where the operator receives a command from the controller via the display screen to "connect tether" to the seat's wire harness connector. Depending on the seat model/type and the number and type of power adjustments, the system will then either prompt the operator to perform, or automatically perform, a series of powered adjustments on the seat which are individually verified by the controller by comparing the internal motor adjustments in real time to the measurements observed by the external sensor array 100 behind the seat assembly.

FIG. 6 illustrates at steps 350–390 that various types of power seat adjustments and internal function arrangements are possible. For example, the inventive system can be used to test a "power thrift seat" at 350 with only a few simple movement functions; a "power seat" at 360 with more numerous and/or more complicated powered adjustment functions; a "power/heat" seat at 370 in which the function of an internal seat-heating mechanism is checked internally through a seat module connected to the tethered wire harness, in addition to the internal/external closed loop testing of the power adjustment functions. Steps 380 and 390 illustrate the further possibility of a powered seat with memory functions in which the seat assembly. can be "taught" certain movement functions and limits of travel at the testing station by the operator in response to prompts from the testing system.

Generally, after the seat type has been verified and the tether 204 connected, each adjustment motor axis is tested, one at a time, by driving the motor to first one and then the other of its travel limits. This is accomplished either by the operator (through adjustment switches such as 13b, 13c described above) in response to prompts from the display screen, or automatically by the controller sending signals to the seat module, if the seat is so equipped. Examples of internal function measurements verified by the external sensor array include motor up/forward direction in which the current is monitored and must be within a specified range; motor down or backward direction, again with current remaining in a specified range; and a "stall" current spike at the end of motor travel in order to allow the operator to continue on with testing other motors and seat adjustments. The real time monitoring of internal motor adjustment via the sensor array ensures that each motor is traveling in the correct direction. It also ensures that the seats actually reach their proper end of travel limits when a current spike is observed from the motor. And, the sensor array will verify when the internal adjustment motors have returned the seat components to their final "eship" positions for transport, as specified by the customer.

Optionally, the system may initiate a printer 206 (FIG. 3) to print a sticker for a "pass" or "fail" status, and can further write the test history and results information to the CDS 106 for later review and analysis.

As mentioned above, certain types of powered seats may have purely "internal" functions (for example internal heating mechanisms) not verifiable by the external sensor array. These internal functions are tested as part of the overall test sequence along with the externally-verifiable internal parameters such as motor direction, end of travel, etc.

Figure 6A:
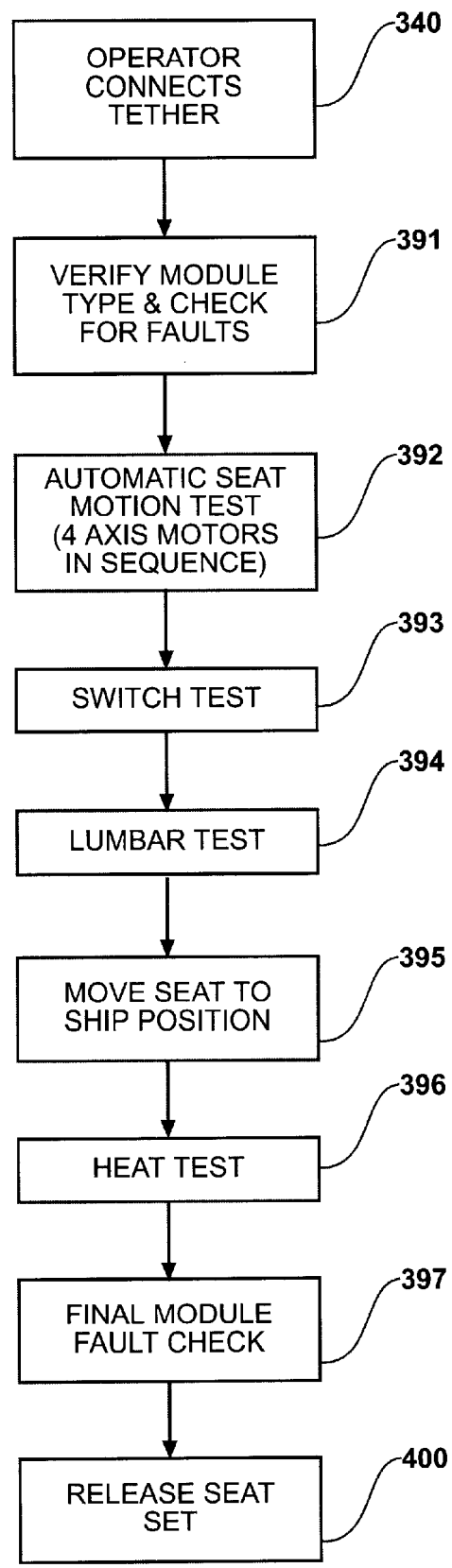
FIG. 6A is a schematic flowchart representation of an illustrative example of a test subroutine for execution by the system described above to test a powered seat with position memory and heat.

FIG. 6A illustrates an example of the test subroutine for a driver-side "power/memory with heat" seat (step 390 in FIG. 6). After the operator has connected the tether 204 to the seat wiring harness, controller 104 begins communication with the seat module to verify the module type and check for faults (step 391). Next, the controller initiates a subroutine residing in the seat module to run all four axis motors to their full extreme of travel in each direction (step 392). This requires no operator action. The sensor array 100 monitors the actual movement of the seat during this test to ensure that each motor actuates the seat in the correct direction and that the seats reach their proper end of travel limits.

In step 393, the operator is prompted by the display screen 202b to move all four switches (e.g., front tilt, rear tilt, horizontal, recliner) to their full stops, thus testing for proper mechanical and electrical functioning of the switches.

In step 394, the display screen 202b prompts the operator to press a button on keypad 202a to initiate a test of the movable lumbar support within the seat. The operator then presses and holds a switch on the seat which extends the lumbar support, and the seat module checks for proper movement of the support before displaying a "test complete" message on the screen 202b. This is preferably an "internal test", and therefore is not sensed by illustrated array 100, although it would be possible to measure movement of the lumbar support with an additional sensor mounted in front of or to the side of the seat In step 395, the operator actuates the horizontal axis motor switch to move the seat forward until it is in its proper shipping position. Display screen 202b notifies the operator when this position has been reached.

In step 396, the controller automatically initializes the "heat test" sequence. In this subroutine, the electric heater in the seat is activated and the heater current and thermistor values are compared with known acceptable ranges. Driver and passenger seat heaters may be tested in sequence or simultaneously.

In step 397, a final check is made for faults in the seat module. This is also an automatic test, requiring no operator action.

After both the driver and passenger seats of the palletized seat assembly 10 have successfully passed all tests, the system proceeds to step 400 where the operator receives a "release seat" command through the display screen 202b, removes the tether and provides a verification or acknowledgment signal from the terminal to the controller that the tether is removed and the seat has been released. The system then checks to make sure that all the tethers have been returned to their home positions; all information that was compiled by the tester throughout the test is transferred to the CDS 106; and the test program is reset and the system sends a signal to the conveyor for pallet control to revert back to the conveyor system.

The system may activate printer 206 (see FIG. 3) to print a sticker or label indicating "pass/fail" status and as much detailed information on the seat assembly and test results as is required for the particular seat testing operation.

Test subroutines for the "power/heat seat" and "power/memory seat" (steps 370 and 380, respectively, in FIG. 6) are generally similar to that shown in FIG. 6A, with certain steps omitted or changed to match the particular trim style of the seat under test, as will be apparent to a person of skill in the art.

The "power thrift seat" and "power seat" represent relatively simple power-adjustable seats, with direct wire harness connection to adjustment motors and control switches, and do not have a seat module. Consequently, the test subroutines for these types of seats differ from those of the more complicated seats referred to above primarily in that 1) the tests of the seat motion along the four motors axes is performed manually by the operator rather than automatically by the controller through the seat module, and 2) there is no seat module on which to run a diagnostic test.

Figure 6B:
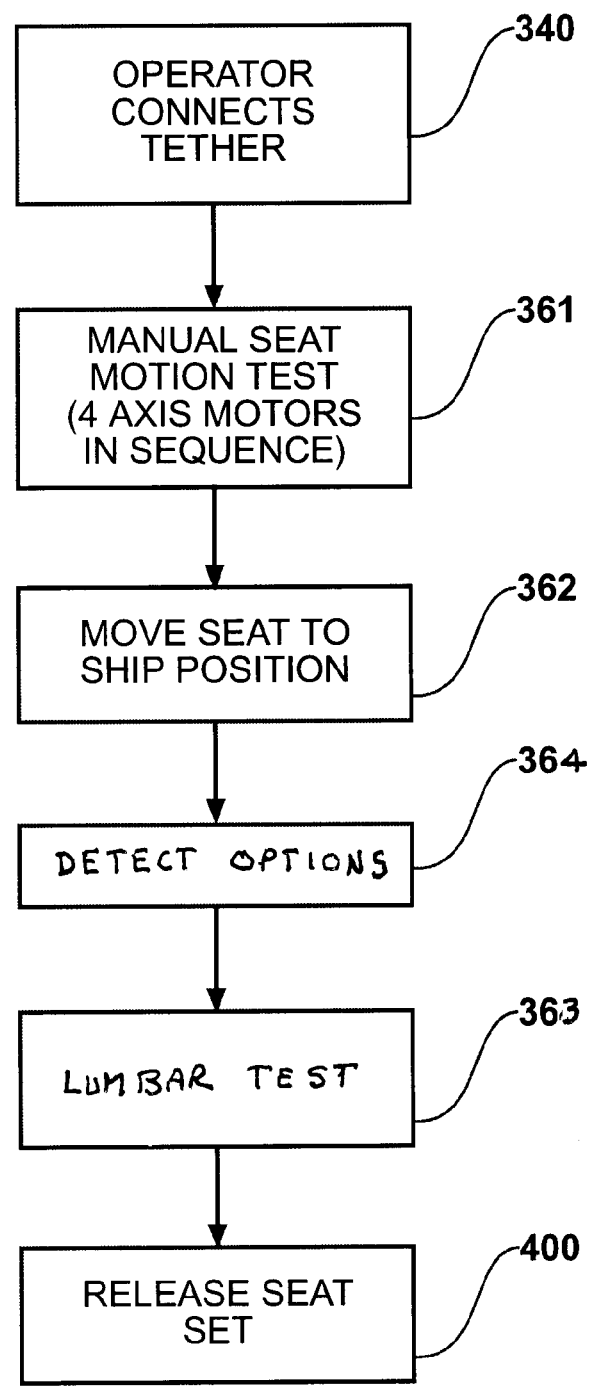
FIG. 6B is a schematic flowchart representation of an illustrative example of a test subroutine for execution by the system described above to test a basic powered seat.

FIG. 6B illustrates an exemplary test subroutine for testing a basic "power seat" (step 360 in FIG. 6). After the operator has connected the tether 204 to the seat wiring harness (step 340), the display 202b prompts the operator to manually actuate the proper switches on the seat to run all four axis motors to their full extreme of travel in each direction (step 361). As the seat moves during this step, the sensor array 100 monitors seat movement in real time to ensure that each motor runs in the correct direction. Motor current is also monitored by the controller 104 and must fall within a specified range for each motor, with a current spike occurring at the proper end of travel limit for each axis of adjustment.

At the end of the seat movement test, the operator is prompted by the display 202b to return the seat to the ship position (step 362), and notifies the operator when this position has been reached.

In block 363, the sensor array checks for the presence of the correct options (headrest, armrests, storage drawers, etc.) as dictated by the seat identity data transferred to controller 104 from CDS 106.

In block 364, a lumbar test is prompted and performed substantially identical to that described above in relation to the "power/memory with heat" seat.

After both the driver and passenger seats of the palletized seat assembly 10 have successfully passed all tests, the system proceeds to step 400 where the operator receives a "release seat" command through the display screen 202b, removes the tether and provides a verification or acknowledgment signal from the terminal to the controller that the tether is removed and the seat has been released. The system then checks to make sure that all the tethers have been returned to their home positions; all information that was compiled by the tester throughout the test is transferred to the CDS 106; and the test program is reset and the system sends a signal to the conveyor for pallet control to revert back to the conveyor system.

The foregoing description has been of a preferred and exemplary embodiment of both the apparatus and methods of the invention, and is not intended to limit the invention to the specific forms illustrated. It will be understood by those skilled in the art that the invention can be readily adapted to many different seat assembly testing operations, and is capable of modification and adaptation to different test station environments, conveyor systems, and the different adjustments and adjustment mechanisms found among the variety of adjustable seats both currently known and future.

For example, the controller apparatus and logic for the non-contact sensor array, tether communication to the internal seat module, and the operator interface can use many different forms of PLC controller or PC-based software control, or any other type of controller capable of carrying out the functions and communicating with the various apparatus described above. Likewise, the form of operator interface is not critical to the invention, although a screen display type with some sort of touch-or keypad entry for the operator is preferred. The form of non-contact sensor used in the sensor array can also vary according to whatever commercially available apparatus is best suited for a particular seat assembly. The arrangement of sensors and the seat parts whose external adjustment is verified thereby can also vary widely and is not limited to the examples set forth in this specification. These and other differences between apparatus and methods falling within the scope of the appended claims and the illustrated embodiment herein will be apparent to those skilled in the art without departing from the scope of the invention.

We accordingly claim:

1. An apparatus for testing a power adjustment seat having adjacent adjustable seat mechanism operated to move adjustable parts of the seat at a seat testing station prior to installation of the seat, comprising:

a sensor mounted adjacent the seat testing station, the sensor aligned with and targeting a specific adjustable part of the seat, the sensor being capable of directly sensing the position of the adjustable part of the seat in at least an adjusted position thereof without physically contacting the adjustable part of the seat, the sensor further being capable of generating a verification signal to a controller as to whether the adjustable seat part is in the adjusted position, wherein the sensor communicates in closed-loop fashion with the controller, the controller comprising an internal function tester connected at the testing station to an internal seat adjustment mechanism which operates the adjustable seat part to test the internal function of that mechanism independently of the physical position of the adjustable seat part, wherein the controller receives the verification signal the sensor and compares the verification signal to the internal function of the internal seat adjustment mechanism, thereby providing a means for verifying whether the physical position of the seat part corresponds to a position indicated by the internal function of the internal seat adjustment mechanism.

2. A system for testing the function of an adjustable seat at a seat testing station prior to installation of the seat, comprising:

a sensor aligned with and targeting an adjustable seat part at the testing station, the sensor being positioned to directly sense movement of the adjustable seat part from a first position to a second adjusted position thereof without physically contacting the adjustable part of the seat, and to provide a signal verifying the arrival of the adjustable seat part in the second adjusted position, the system further comprising an internal function tester capable of communicating by tether connection with a seat control module in a power adjustable seat at the end of line testing station, the internal function tester being capable of testing the function of an internal seat adjustment mechanism controlling the movement of the adjustable seat part when connected to the seat control module and producing an output correlating the function of the internal seat adjustment mechanism to movement of the adjustable seat part, the internal function tester also communicating with the sensor such that when a power adjustable seat is in the end of line testing station and connected to the internal function tester, the verifying signal from the sensor is compared to the movement-correlated output from the internal function tester to provide a closed loop verification of the output from the internal function tester.

* * * * *

UNITED STATES PATENT AND TRADEMARK OFFICE
CERTIFICATE OF CORRECTION

PATENT NO. : 6,523,417 B1
DATED : February 25, 2003
INVENTOR(S) : Thomas J. Donahue et al.

It is certified that error appears in the above-identified patent and that said Letters Patent is hereby corrected as shown below:

Column 1,
Line 13, delete "." between "*rest*" and "*with*"

Column 2,
Line 6, delete "." between "*limit*" and "*switches*"

Column 5,
Line 42, change "10c" to -- 100c --
Line 43, change "load" to -- 100d --

Column 9,
Line 43, delete "e" from the beginning of error "*eship*"

Column 12,
Line 5, change "adjustment" to -- adjustable --
Line 5, after "*having*" insert -- an internal seat --
Line 6, after "*move*" insert -- power --
Line 10, after "*specific*" insert -- power --
Lines 12 and 14, after "*the*" insert -- power --
Line 16, after "*the*" insert -- power --; delete "seat" after "*part*" insert -- of the seat --
Line 21, after "*the*" insert -- power --; delete "seat"
Line 22, after "*part*" insert -- of the seat --
Line 23, after "*the*" insert -- power --
Line 24, delete "seat"
Line 25, after "*signal*" insert -- from --

UNITED STATES PATENT AND TRADEMARK OFFICE
CERTIFICATE OF CORRECTION

PATENT NO.   : 6,523,417 B1
DATED        : February 25, 2003
INVENTOR(S)  : Thomas J. Donahue et al.

It is certified that error appears in the above-identified patent and that said Letters Patent is hereby corrected as shown below:

<u>Column 12 cont'd,</u>
Line 26, after "*signal*" insert -- from the sensor --
Line 28, after "*the*" insert -- power adjustable --; delete "seat" after "*part*"
insert -- of the seat --

Signed and Sealed this

Seventh Day of October, 2003

JAMES E. ROGAN
*Director of the United States Patent and Trademark Office*